(12) United States Patent
Vodev

(10) Patent No.: US 10,272,967 B2
(45) Date of Patent: Apr. 30, 2019

(54) FOLDING FENDER

(71) Applicant: Valentin Vodev, Sofia (BG)

(72) Inventor: Valentin Vodev, Sofia (BG)

(*) Notice: Subject to any disclaimer, the term of this patent is extended or adjusted under 35 U.S.C. 154(b) by 0 days.

(21) Appl. No.: 15/309,785

(22) PCT Filed: May 19, 2015

(86) PCT No.: PCT/IB2015/053695
§ 371 (c)(1),
(2) Date: Nov. 8, 2016

(87) PCT Pub. No.: WO2015/177730
PCT Pub. Date: Nov. 26, 2015

(65) Prior Publication Data
US 2017/0267307 A1 Sep. 21, 2017

(30) Foreign Application Priority Data

May 21, 2014 (AT) .............................. A 50363/2014

(51) Int. Cl.
*B62K 15/00* (2006.01)
*B62J 15/00* (2006.01)
*B62K 3/02* (2006.01)

(52) U.S. Cl.
CPC ............. *B62K 15/006* (2013.01); *B62J 15/00* (2013.01); *B62K 3/02* (2013.01); *B62K 2015/001* (2013.01)

(58) Field of Classification Search
CPC ............. B62J 15/00; B62J 15/02; B62J 15/04
See application file for complete search history.

(56) References Cited

U.S. PATENT DOCUMENTS

| | | | | |
|---|---|---|---|---|
| 6,659,483 B2* | 12/2003 | Blythe | ...................... | B62J 15/00 280/152.1 |
| 6,913,274 B2* | 7/2005 | Hsu | .......................... | B62J 15/00 280/152.1 |
| 8,430,414 B1* | 4/2013 | Yap | ....................... | B62K 15/008 280/278 |
| 2001/0004150 A1* | 6/2001 | Murayama | ............... | B62H 1/02 280/287 |
| 2003/0116937 A1 | 6/2003 | Blythe | | |

(Continued)

FOREIGN PATENT DOCUMENTS

| | | | |
|---|---|---|---|
| CN | 201506426 | | 6/2010 |
| CN | 103587626 A | * | 2/2014 |
| GB | 2435863 | | 9/2007 |

*Primary Examiner* — Kevin Hurley
(74) *Attorney, Agent, or Firm* — Michael D. Eisenberg

(57) ABSTRACT

The invention relates to a foldable bicycle (10) with a first part of the frame (1) that carries a first wheel (11) and a crank-drive (9) and a second part of a frame (2) that carries a crank-drive (9) driven second wheel (12), wherein the first part of the frame (1) and the second part (2) are connected to each other by a swivel connection (4) through which the second wheel (12) that is fastened to the second part of the frame (2) is swiveled by a swivel movement in the direction of the first wheel (11) in the same direction as the pedal axle (A), including the fender (3) belonging to the second wheel (12). In order to also be able to roll the bicycle in a folded state, the fender (3) consists of a first fender part (3*a*) and a second fender part (3*b*), wherein the first fender part (3*a*) is attached to the second part of the frame (2) and the second fender part (3*b*) is movably mounted relative to the first fender part (3*a*).

7 Claims, 5 Drawing Sheets

(56) References Cited

U.S. PATENT DOCUMENTS

| | | | |
|---|---|---|---|
| 2009/0008920 A1* | 1/2009 | Laivins | B62J 15/00 |
| | | | 280/847 |
| 2010/0140896 A1* | 6/2010 | McHale | B62J 1/18 |
| | | | 280/152.3 |
| 2017/0021885 A1* | 1/2017 | Montague | B62H 1/04 |

* cited by examiner

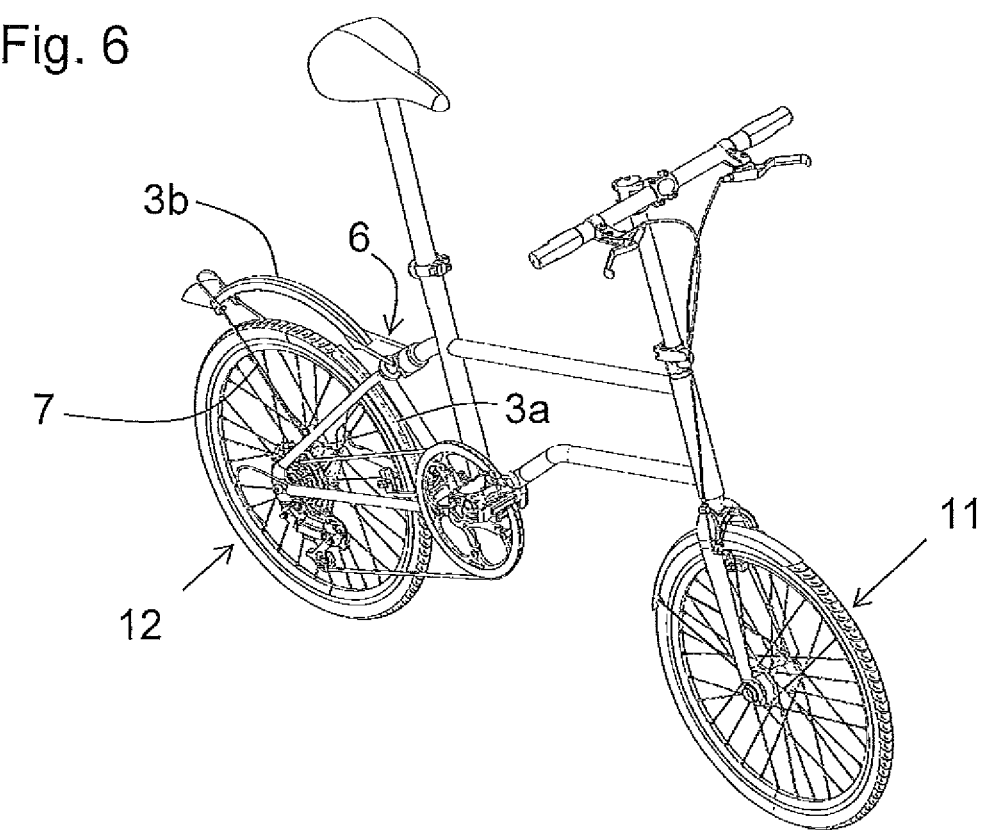

FOLDING FENDER

BACKGROUND

The present invention relates to a foldable bicycle with a first part of a frame comprising a first wheel and crank-drive and a second frame part comprising a second wheel powered by the crank-drive, wherein the first part of the frame and the second part of the frame are joined by a swivel connection and the second wheel, which is attached to the second part of the frame, can be swiveled in the direction of the first wheel by a swivel motion at the pedal spindle including a fender belonging to the second wheel, in accordance to the generic concept of the claim:
Usually with such types of bicycles, during the folding process a part of the frame is swiveled at the swivel axis, which is essentially aligned parallel to the pedal spindle, by performing a swivel motion in the direction of the first wheel. In general the swivel axis is slightly slanted toward the pedal spindle to enable both wheels to overlap sideways when folded, thereby consuming less space in the folded position.

BRIEF SUMMARY OF INVENTION

The fender of the back wheel, in its unfolded and therefore ready-to-ride state, is located above the back wheel and is conventionally moved together with the part of the frame that is being swiveled. When the back wheel is swiveled around the pedal spindle, the fender comes to rest underneath the back wheel. Thus, in its folded position, the fender prevents the rolling of the bicycle, as the back wheel can no longer roll on the ground. Hence, in the folded position such bicycles must be carried, thereby creating considerable discomfort.

The main object of the present invention is to use the existing state of technology to eliminate these disadvantages and to create a foldable bicycle that is easy to transport in its folded position. Such a bicycle should furthermore be characterized by a simple construction.

This object is achieved through the features in claim 1. Claim 1 relates to a foldable bicycle with a first part of the frame comprising the first wheel and the crank-drive and the second part of the frame comprising a second wheel driven by the crank-drive, wherein the first part of the frame and the second frame part are connected to each other by a swivel connection through which the second wheel, mounted on the second part of the frame, can be swiveled in the direction of the first wheel by way of a swivel motion on the pedal spindle including the fender belonging to the second wheel. According to the present state of invention for such bicycles the fender consists of a first fender part and a second fender part, wherein the first part of the fender is mounted on the second part of the frame and the second part of the fender moves in relation to the first part of the fender.

This distribution of fenders makes it possible that all parts of the fenders, which in the folded position would otherwise prevent the rolling of the back wheel, can be swiveled into a position in which the rolling of the back wheel is not hampered. In this way, the bicycle can be transported more easily and comfortably. The relative unhampered movement of the second fender is realized because the relative movement of the fender parts is linked to the folding process; in other words, the relative movement of the fender parts is carried out during the folding process itself.

Preferably it is recommended that the second part of the fender is hinge mounted through a first holding part to the first part of the frame and that a second holding part is hinge mounted to a second part of the frame. In particular the first holding part can be hinge mounted to the second part of the fender facing the end of the first part of the fender. This allows the optimization of the movement kinematics of the second part of the fender linked to the folding process, especially with respect to the space saving design, and guarantees a flexible connection, which allows for the relative movement of both fender parts. The swivel axis, as defined by the fact that it is hinge mounted, is essentially located parallel to the swivel axis of the swivel connection between both parts of the frame.

The first part of the frame and the second part of the frame create together with the first and second holding parts a four-corner linkage for the second part of the fender so that during the entire swivel process, there is always a clearly defined position for the second fender part. Moreover, this kind of construction creates a high degree of stability.

The two-part construction of the tender allows for the movement of the second part of the fender independently from the first part of the fender, allowing the second part of the fender to be brought into position when the bicycle is in its folded state in which the fender does not interfere with the rolling of the wheel to which it belongs. In this way, such a bicycle can be transported in a considerably more comfortable manner. The first part of the fender, which in any case does not disturb the rolling of the bicycle in its folded position, remains attached to the second part of the frame in a fixed position relative to the second part of the frame.

It is furthermore preferably recommended that in the unfolded position of the bicycle, the first part of the frame and the second part of the frame are connectable at a coupling point set around the swivel connection, wherein the first mounting part in the area of the coupling point is hinge mounted to the first part of the frame. The coupling point is on the part of the bicycle where the littlest relative movements occur between the first and second part of the frame while being ridden. Since in its unfolded position the end parts of the fenders are facing each other and preferably overlap loosely together, the diminished relative movements help to avoid unnecessary and undesirable noises around the fender.

Preferably, the coupling point is established thereby as magnetic coupling. The magnetic coupling has the advantage that it provides great coupling strength when exposed to tension and pressure but nevertheless provides easy release under shearing stresses. The coupling point can be executed in a way so that the weight of the cyclist, as well as the vibrations that arise from riding the bicycle, exert enough tension and pressure load on the magnetic coupling while the bike, according to the invention, is unfolded and being ridden, thereby preventing any unintentional swiveling of the frame. In order to fold the bicycle, the magnetic coupling can be easily disconnected by comparison by manually performing a shearing motion.

According to the invention, the foreseen relative movement between both fender parts is characterized preferably by the simultaneous swiveling of the second part of the frame, so that it is itself dependent on the folding process. In principle, however, it is also conceivable that both these processes can be carried out independently from one another, perhaps by allowing the second part of the fender to be brought into position already before being folded and therefore moved independently from the first part of the fender and, as such, does not interfere with the rolling of both wheels of the bicycle in the folded position.

The first-described version, of course, offers the advantage that, apart from the folding process itself, the user does not need to exercise any special action in regard to the fender.

BRIEF DESCRIPTION OF DRAWINGS

The present invention will become apparent from the following preferable versions with the help of detailed drawings.

DETAILED DESCRIPTION OF THE EMBODIMENTS OF THE INVENTION

Figure 1:
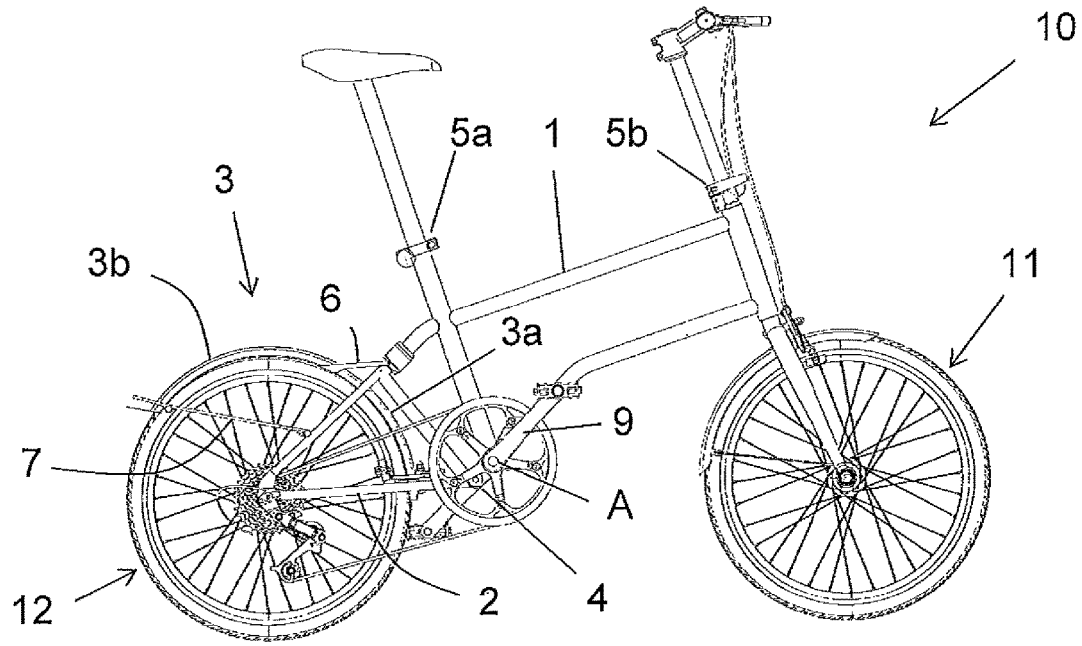
FIG. 1 the bicycle, in accordance to the invention, in its unfolded and ready to be ridden state FIGS. 2 to 4 the bicycle from FIG. 1 showing various positions during the folding process FIG. 5 the bicycle from FIG. 1 in it completely folded position, and FIG. 6 the bicycle in a perspective view shortly after beginning the folding process

FIG. 1 shows a foldable bicycle 10 with the first part of the frame 1 that holds a first wheel 11 and a crank-drive 9, and a second part of the frame 2 that holds a crank-drive 9 in the conventional manner over a second wheel 12 powered by a chain drive 8. The first wheel. 11 is the front wheel and the second wheel 12 is the back wheel of bicycle 10.

Figure 2:
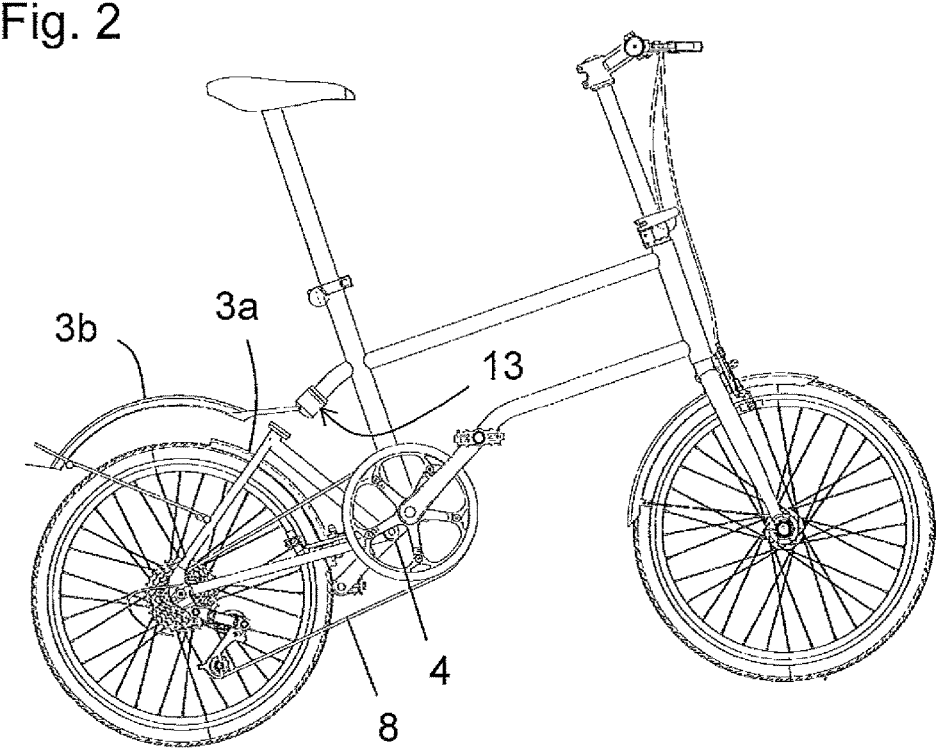
Figure 3:
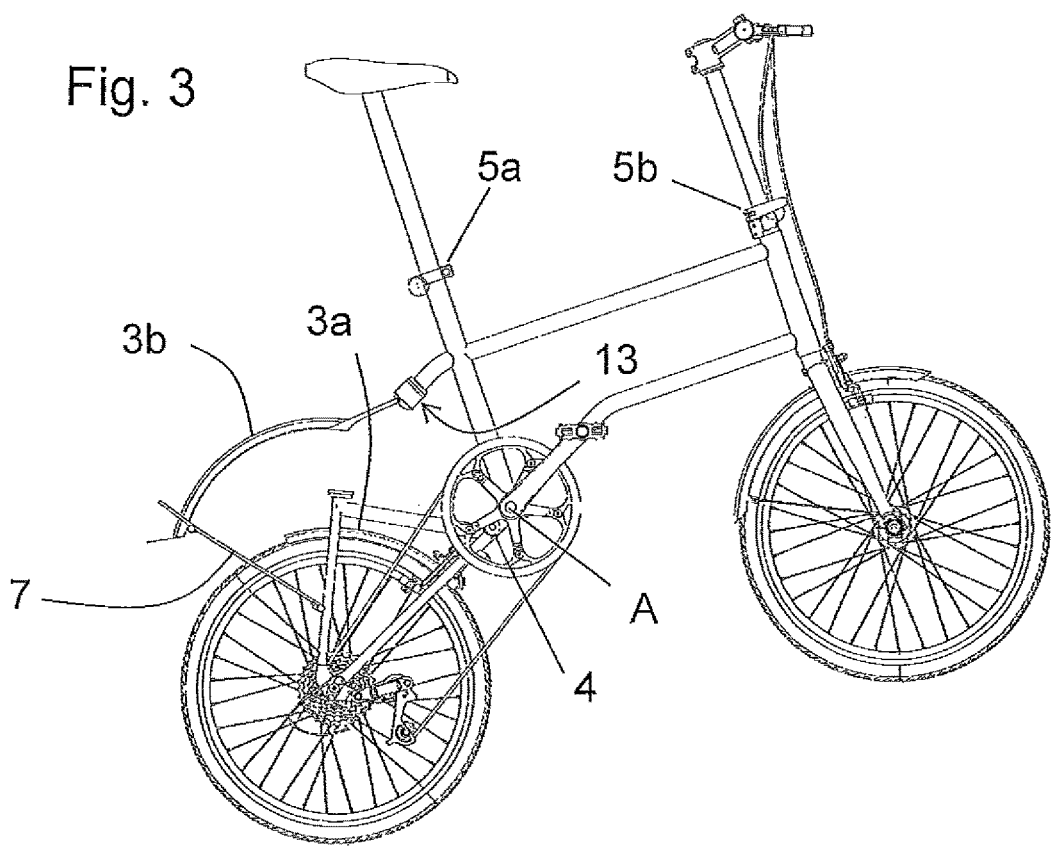
Figure 4:
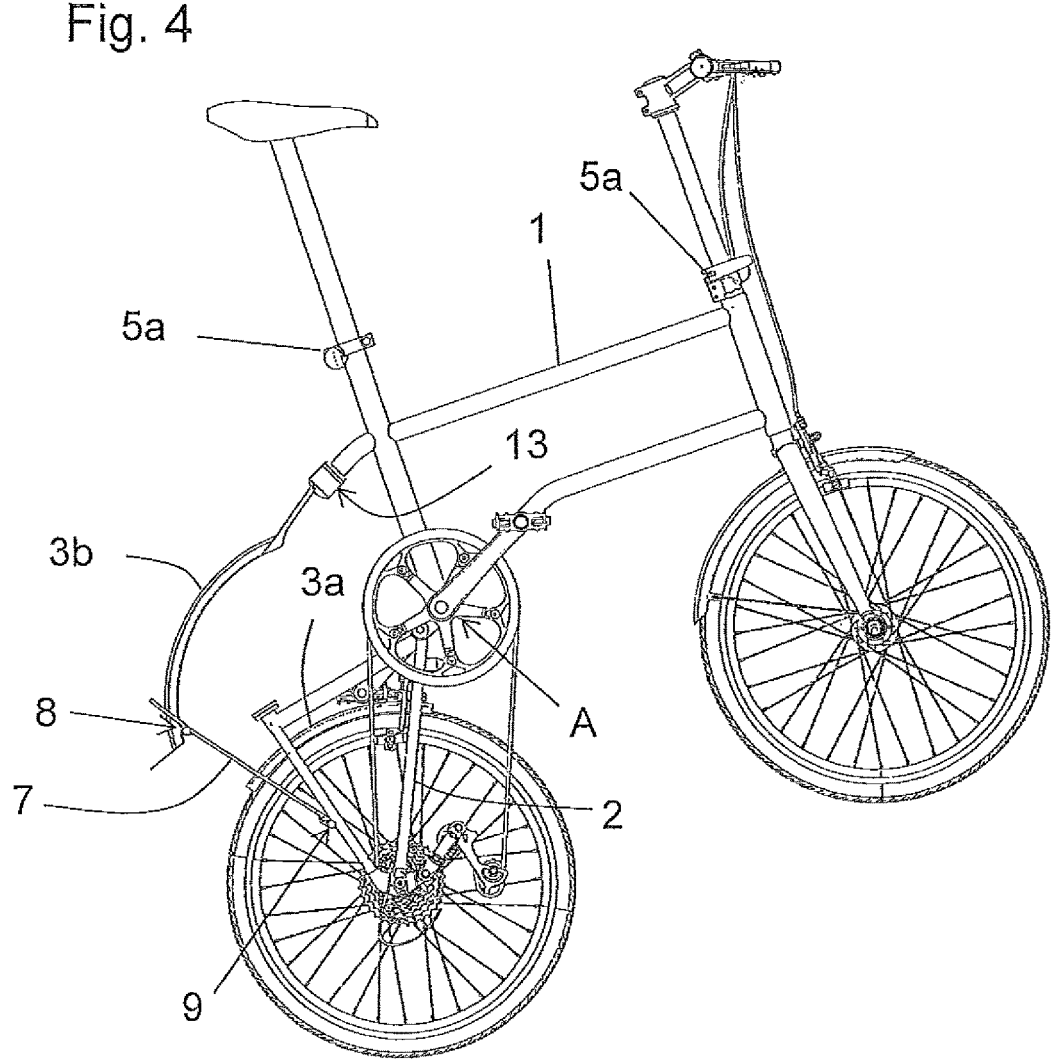
Figure 5:
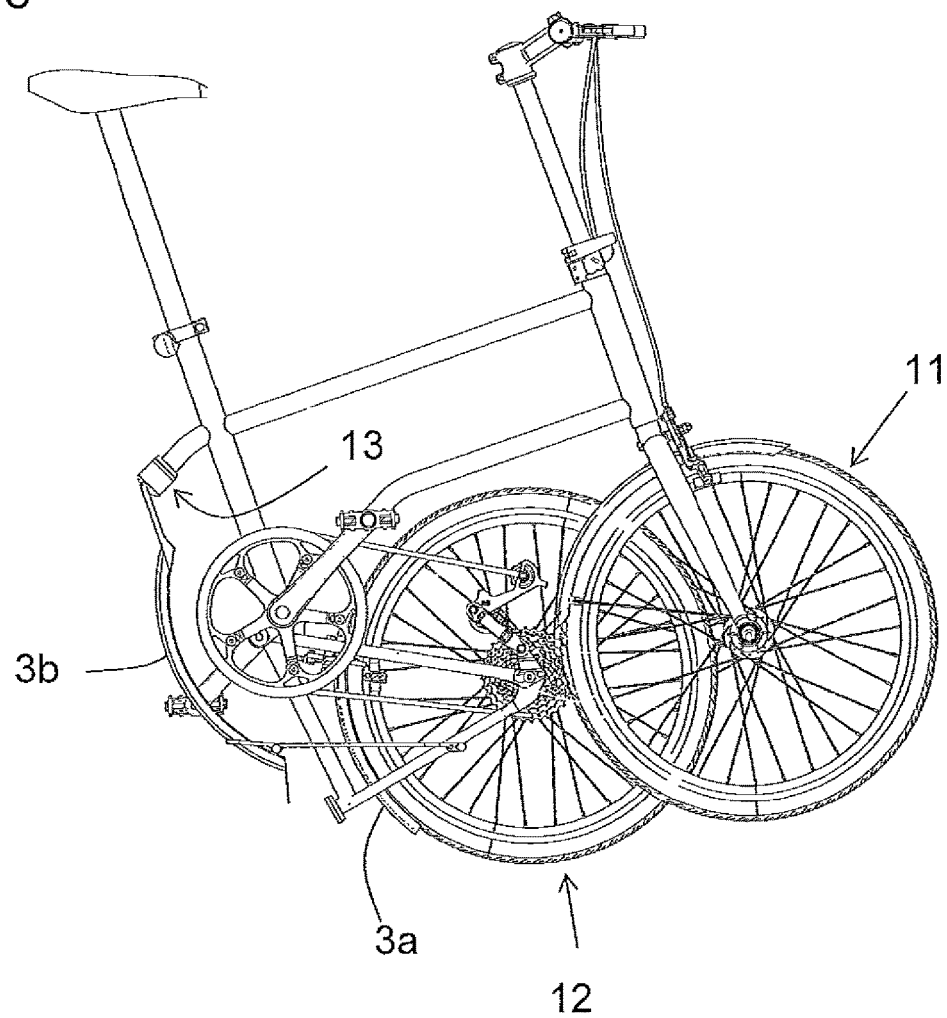

The first (front) part of the frame 1 and the second (back) part of the frame 2 are joined by a swivel connection 4 through which the second part of the frame 2, which holds the second wheel 12 on the lower part of bicycle 10, can be swiveled to first wheel 11. The position of the swivel axle of the swivel connection 4 can collapse with pedal spindle A, however in the shown model, it is slightly offset to pedal spindle A. In both cases however the second wheel 12, which is connected to the second part of frame 2, can be swiveled with a swivel motion at the stationary pedal spindle A in the direction of the first wheel 11. The swivel axis of the swivel connection 4 can thereby he placed parallel to pedal axis A or even slightly, at the most 15°, inclined toward pedal axis A. Such an inclined version guarantees that when bicycle 10 is folded, the second wheel 12 is situated at least partially at the side of the first wheel 11, as is shown in FIG. 5. FIGS. 2 to 4 each show the various swivel positions of the second part of the frame 2 during the folding process. FIG. 6 shows a perspective representation of the swivel position pursuant to FIG. 2.

In the ready-to ride state of bicycle 10 pursuant to FIG. 1, the first part of the frame 1 and the second part of the frame 2 can be connected to each other by a coupling point 13 and brought into position by swivel connection 4. Coupling point 13 creates, on the one hand, a point of contact for the second part of frame 2, thereby preventing unfolding, and on the other hand, it produces a detachable but strong connection between the first part of frame 1 and second part of frame 2. The coupling point 13 is preferably established by a magnetic coupling.

The bicycle 10 further consists of a handlebar post with handlebars and a seat post with a saddle. Each of them is fastened to the first part of frame 1 through a detachable locking mechanism. By loosening the locking mechanism 5a, the seat post can be adjusted telescopically into the first part of the frame 1 and by means of loosening the locking mechanism 5b, the handle post can be adjusted telescopically into the first part of the frame 1.

The second bicycle 12 demonstrates fender 3, hick consists of first tender part 3a and second fender part 3b.

In the unfolded and ready-to-ride state of bicycle 10 pursuant to FIG. 1, the first part of the fender 3a is at least partially facing the first wheel 11 thereby making it closer than the second part of the fender 3b. The first part of the fender 3a is located on the second part of the frame 2 and is attached in a fixed position relative to the second part of the frame. The second fender part 3b, in its unfolded and ready-to-ride state of bicycle 10 pursuant to FIG. 1, is placed over the second wheel 12 and is movable relative to the first part of the fender 3a. Thereby the second part of the fender 3b is hinge mounted with the first part of the frame 1 by a first mounting part 6. On the one hand, the first mounting part 6 is hinge mounted to the second part of the fender 3b facing the end parts at the first part of fender part 3a, while on the other, also hinge mounted on the first part of the frame 1 at the coupling point 13. As can be seen in FIG. 6, the first mounting part 6 can consist of two essentially parallel support rods, which encompass a section of the first part of the frame 1 and/or a section of the second frame part 2.

The second fender part 3b is furthermore attached to the second part of frame 2. This connection is achieved over a second mounting part 7, which is hinge mounted to the second part of the fender 3b and the second part of frame 2 (see FIG. 4). As can be seen in FIG. 6, the second mounting part 7 consists of two support rods running essentially parallel to each other, that encompass the second wheel 12. The first part of the frame 1 and the second part of the frame 2 create, together with the first mounting part 6 and the second mounting part 7, a four-corner linkage system for the second fender part 3b. The axes of the four-corner linkage are essentially parallel to one another. +

In the unfolded state of bicycle 10, the end pieces of the fender parts 3a and 3b facing each other overlap loosely together (FIG. 1). By releasing the coupling point 13 the second part of the frame 2 can be swiveled relative to the first part of the frame 1 (FIG. 2). As can be seen in FIG. 2 and FIG. 5, the movement of the second part of the fender 3b relative to the first part of the fender 3a subsequently coupled to the folding process of bicycle 10.

In the completely folded state of bicycle 10, as represented in FIG. 5, the second part of the fender 3b is brought into a position that prevents it from hampering the rolling of the second wheel 12. As seen in FIG. 5, bicycle 10 can be easily rolled and transported in its folded and not ready-to-ride state. The invention thereby presents a foldable bicycle that can be easily transported also in its folded state.

The invention claimed is:

1. A foldable bicycle with a first part of a frame, that comprises a first wheel and a crank-drive, and a second part of the frame that comprises a crank-drive driven second wheel, wherein the first part of the frame and the second part of the frame are connectable to one another by means of a swivel connection through which the second wheel attached to the second part of the frame can be swiveled in the direction of the first wheel by means of a swivel movement at a pedal axle (A), and with a fender belonging to the second wheel, characterized by the fender comprising a first fender part and a second fender part, wherein the first fender part is fastened to the second part of the frame and the second part of the fender is hinge mounted to the first part of the frame;

wherein the second fender part is hinge mounted to the first part of the frame on a first mounting part as well as to a second mounting part hinge mounted to the second part of the frame.

2. The bicycle of claim 1, wherein the first mounting part is hinge mounted to the second fender part in an area of the facing end pieces hinge mounted on the first fender part.

3. The bicycle of claim 1 wherein the first part of the frame and the second part can be connected to each other at a coupling point, functioning by way of a swivel connection, wherein the first mounting part is hinge mounted to the first part of the frame at the coupling point.

4. The bicycle of claim 3 wherein the coupling point is a magnetic coupling.

5. The bicycle of claim 1, wherein when the bicycle is in its unfolded state, the end pieces of the fender parts that face each other overlap loosely together.

6. The bicycle of claim 2 wherein the first part of the frame and the second part can be connected to each other at a coupling point, functioning by way of a swivel connection, wherein the first mounting part is hinge mounted to the first part of the frame at the coupling point.

7. The bicycle of claim 2, wherein when the bicycle is in its unfolded state, the end pieces of the fender parts that face each other overlap loosely together.

\* \* \* \* \*